(12) United States Patent
Izawa et al.

(10) Patent No.: US 11,459,237 B2
(45) Date of Patent: *Oct. 4, 2022

(54) CARBONACEOUS MATERIAL FOR NEGATIVE ELECTRODE ACTIVE MATERIAL FOR NON-AQUEOUS ELECTROLYTE SECONDARY BATTERIES, NON-AQUEOUS ELECTROLYTE SECONDARY BATTERY NEGATIVE ELECTRODE, NON-AQUEOUS ELECTROLYTE SECONDARY BATTERY, AND PRODUCTION METHOD OF CARBONACEOUS MATERIAL

(71) Applicant: KURARAY CO., LTD., Kurashiki (JP)

(72) Inventors: Takafumi Izawa, Kurashiki (JP); Kengo Tachikawa, Kurashiki (JP); Hideharu Iwasaki, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 272 days.

This patent is subject to a terminal disclaimer.

(21) Appl. No.: 16/628,191

(22) PCT Filed: Jul. 4, 2018

(86) PCT No.: PCT/JP2018/025389
§ 371 (c)(1),
(2) Date: Jan. 2, 2020

(87) PCT Pub. No.: WO2019/009333
PCT Pub. Date: Jan. 10, 2019

(65) Prior Publication Data
US 2021/0094826 A1    Apr. 1, 2021

(30) Foreign Application Priority Data
Jul. 6, 2017    (JP) .............................. JP2017-133040

(51) Int. Cl.
*C01B 32/05* (2017.01)

(52) U.S. Cl.
CPC .......... *C01B 32/05* (2017.08); *C01P 2002/82* (2013.01); *C01P 2002/85* (2013.01); *C01P 2006/12* (2013.01); *C01P 2006/14* (2013.01)

(58) Field of Classification Search
None
See application file for complete search history.

(56) References Cited

U.S. PATENT DOCUMENTS

| 2006/0093915 | A1 | 5/2006 | Lundquist et al. |
| 2010/0159346 | A1 | 6/2010 | Hinago et al. |

(Continued)

FOREIGN PATENT DOCUMENTS

| CN | 101641810 A | 2/2010 |
| CN | 103190019 A | 7/2013 |

(Continued)

OTHER PUBLICATIONS

Extended European Search Report dated Feb. 15, 2021 in European Patent Application No. 18828656.1, citing documents AA, AO and AX therein, 9 pages.

(Continued)

*Primary Examiner* — Daniel S. Gatewood
(74) *Attorney, Agent, or Firm* — Oblon, McClelland, Maier & Neustadt, L.L.P.

(57) ABSTRACT

A problem to be solved by the present invention is to provide a carbonaceous material suitable for a negative electrode active material for non-aqueous electrolyte secondary batteries (e.g., lithium ion secondary batteries, sodium ion secondary batteries, lithium sulfur batteries, lithium air batteries) having high charge/discharge capacities and preferably high charge/discharge efficiency as well as low resistance, a negative electrode comprising the carbonaceous (Continued)

material, a non-aqueous electrolyte secondary battery comprising the negative electrode, and a production method of the carbonaceous material. The present invention relates to a carbonaceous material having a nitrogen element content of 1.0 mass % or more and an oxygen content of 1.5 mass % or less obtained by elemental analysis, a ratio of nitrogen element content and hydrogen element content ($R_{N/H}$) of 6 or more and 100 or less, a ratio of oxygen element content and nitrogen element content ($R_{O/N}$) of 0.1 or more and 1.0 or less, and a carbon interplanar spacing ($d_{002}$) observed by X-ray diffraction measurement of 3.70 Å or more.

13 Claims, 2 Drawing Sheets

(56) References Cited

U.S. PATENT DOCUMENTS

| | | | |
|---|---|---|---|
| 2012/0208089 A1 | 8/2012 | Sawayama et al. | |
| 2013/0252093 A1 | 9/2013 | Yokomizo et al. | |
| 2015/0180020 A1 | 6/2015 | Komatsu et al. | |
| 2015/0188137 A1* | 7/2015 | Komatsu | H01M 4/587 429/231.8 |
| 2016/0064735 A1 | 3/2016 | Tada et al. | |
| 2017/0015559 A1 | 1/2017 | Costantino et al. | |
| 2018/0008968 A1* | 1/2018 | Pham-Huu | B01J 27/20 |
| 2018/0323433 A1 | 11/2018 | Kawakami et al. | |
| 2020/0148886 A1 | 5/2020 | Costantino et al. | |

FOREIGN PATENT DOCUMENTS

| | | | | |
|---|---|---|---|---|
| JP | 2006-83012 | A | 3/2006 | |
| JP | 5233314 | B2 | 7/2013 | |
| JP | 5477391 | B2 | 4/2014 | |
| JP | 2017-84706 | A | 5/2017 | |
| TW | 201419639 | A | 5/2014 | |
| WO | WO 2014/034858 | A1 | 3/2014 | |
| WO | WO 2014/038492 | A1 | 3/2014 | |
| WO | WO 2015/129200 | A1 | 9/2015 | |
| WO | WO 2015/137980 | A1 | 9/2015 | |
| WO | WO-2016116542 | A1 * | 7/2016 | .......... B01J 37/0236 |
| WO | WO 2017/022449 | A1 | 2/2017 | |

OTHER PUBLICATIONS

Deshmukh, A.A., et al., "Carbon Spheres", Materials Science and Engineering R, vol. 70, No. 1-2, Sep. 20, 2010, XP027278833, pp. 1-28.

Combined Taiwanese Office Action and Search Report dated Jun. 15, 2021 in corresponding Taiwanese Patent Application No. 1078123154 (with English Translation of Category of Cited Documents) citing documents AO-AQ therein, 4 pages.

International Search Report dated Aug. 21, 2018 in PCT/JP2018/025389, citing documents AB, AC and AO-AS therein, 1 pages.

English translation of the International Preliminary Report on Patentability and Written Opinion of the International Searching Authority dated Jan. 16, 2020 in PCT/JP2018/025389 filed Jul. 4, 2018, AB, AC and AO-AS therein, 6 pages.

* cited by examiner

CARBONACEOUS MATERIAL FOR NEGATIVE ELECTRODE ACTIVE MATERIAL FOR NON-AQUEOUS ELECTROLYTE SECONDARY BATTERIES, NON-AQUEOUS ELECTROLYTE SECONDARY BATTERY NEGATIVE ELECTRODE, NON-AQUEOUS ELECTROLYTE SECONDARY BATTERY, AND PRODUCTION METHOD OF CARBONACEOUS MATERIAL

TECHNICAL FIELD

This patent application claims priority under the Paris Convention based on Japanese Patent Application No. 2017-133040 (filed Jul. 6, 2017) incorporated herein by reference in its entirety.

The present invention relates to a carbonaceous material suitable for a negative electrode active material for non-aqueous electrolyte secondary batteries, a non-aqueous electrolyte secondary battery negative electrode comprising the carbonaceous material, a non-aqueous electrolyte secondary battery comprising the negative electrode, and a production method of carbonaceous material.

BACKGROUND ART

Non-aqueous electrolyte secondary batteries such as lithium ion secondary batteries have high energy density and excellent output characteristics and are therefore widely used in small portable devices such as mobile phones and notebook computers. In recent years, the batteries are also increasingly applied to in-vehicle use for hybrid vehicles, electric vehicles, etc. For a negative electrode material for a lithium ion secondary battery, nitrogen-containing non-graphitizable carbon capable of being doped (charged) and dedoped (discharged) with lithium in an amount exceeding the theoretical capacity of 372 mAh/g of graphite has been developed (e.g., Patent Documents 1, 2, 3), and used.

Nitrogen-containing non-graphitizable carbon can be obtained, for example, by using a phenol resin as a carbon source and amine as a nitrogen source, or using a resin having an amine group such as an aniline resin as a carbon source, and performing a heat treatment. However, when nitrogen-containing non-graphitizable carbon is produced by using these raw materials, a step of fixing the nitrogen element is required for increasing a nitrogen element content, which reduces the productivity, and the fixing step tends to increase oxygen and hydrogen element contents as well.

The nitrogen element in the carbonaceous material acts as a lithium ion storage site, has smaller adsorption/desorption energies as compared to when lithium ions are stored in voids and defect portions between carbon layers and between carbon crystals, and therefore allows efficient ionic migration, which tends to lead to lower resistance.

PRIOR ART DOCUMENTS

Patent Documents

Patent Document 1: Japanese Laid-Open Patent Publication No. 2006-083012
Patent Document 2: Japanese Patent No. 5233314
Patent Document 3: Japanese Patent No. 5477391

SUMMARY OF THE INVENTION

Problem to be Solved by the Invention

Studies are recently conducted on application of lithium ion secondary batteries to in-vehicle use, and a further increase in capacity of lithium ion secondary batteries is demanded. To further improve input/output characteristics of non-aqueous electrolyte secondary batteries, a carbonaceous material providing a battery with low internal resistance may be required.

Therefore, an object of the present invention is to provide a carbonaceous material suitable for a negative electrode active material for non-aqueous electrolyte secondary batteries (e.g., lithium ion secondary batteries, sodium ion secondary batteries, lithium sulfur batteries, lithium air batteries) having high charge/discharge capacities and preferably high charge/discharge efficiency as well as low resistance, a negative electrode comprising the carbonaceous material, a non-aqueous electrolyte secondary battery comprising the negative electrode, and a production method of the carbonaceous material.

Means for Solving Problem

The present inventors found that the object can be achieved by a carbonaceous material of the present invention described below.

Therefore, the present invention comprises the following preferred aspects.

[1] A carbonaceous material having a nitrogen element content of 1.0 mass % or more and an oxygen content of 1.5 mass % or less obtained by elemental analysis, a ratio of nitrogen element content and hydrogen element content ($R_{N/H}$) of 6 or more and 100 or less, a ratio of oxygen content and nitrogen content ($R_{O/N}$) of 0.1 or more and 1.0 or less, and a carbon interplanar spacing ($d_{002}$) observed by X-ray diffraction measurement of 3.70 Å or more.

[2] The carbonaceous material according to [1], wherein a value of half-value width of a peak near 1360 $cm^{-1}$ of the Raman spectrum observed by laser Raman spectroscopy is 190 $cm^{-1}$ to 270 $cm^{-1}$.

[3] The carbonaceous material according to [1], wherein a value of half-value width of a peak near 1360 cm of the Raman spectrum observed by laser Raman spectroscopy is 190 to 250 $cm^{-1}$.

[4] The carbonaceous material according to any one of [1] to [3], wherein a value of half-value width of a peak near 1650 $cm^{-1}$ of the Raman spectrum observed by laser Raman spectroscopy is 100 $cm^{-1}$ or less.

[5] The carbonaceous material according to any one of [1] to [3], wherein a half-value width of a peak near 1650 $cm^{-1}$ of the Raman spectrum observed by laser Ranan spectroscopy exceeds 100 $cm^{-1}$.

[6] The carbonaceous material according to any one of [1] to [5], wherein a specific surface area obtained by a BET method is 40 $m^2/g$ or more, and wherein a pore volume represented by a sum of a micropore volume and a mesopore volume is 0.05 mL/g or more.

[7] The carbonaceous material according to any one of [1] to [5], wherein a specific surface area obtained by a BET method is 35 $m^2/g$ or less, and wherein a pore volume represented by a sum of a micropore volume and a mesopore volume is less than 0.05 mL/g.

[8] The carbonaceous material according to any one of [1] to [7], wherein the carbonaceous material is derived from a saccharide.

[9] The carbonaceous material according to any one of [1] to [8], which is for use as a negative electrode active material of non-aqueous electrolyte secondary batteries.

[10] A non-aqueous electrolyte secondary battery negative electrode comprising: the carbonaceous material according to [9].

[11] A non-aqueous electrolyte secondary battery comprising: the non-aqueous electrolyte secondary battery negative electrode according to [10].

[12] A production method of the carbonaceous material according to any one of [1] to [9], comprising the steps of:

(1) mixing a saccharide with a substance capable of generating ammonia gas;

(2) increasing a temperature of an obtained mixture in an inert gas atmosphere at a temperature increase rate of 100° C./hour or more to a first predetermined temperature between 500 and 1200° C.;

(3) applying a heat treatment at a temperature of 500 to 1200° C. with an inert gas at a flow rate of 0.5 to 5.0 L/min relative to 5 g of the saccharide to obtain a char;

(4) increasing a temperature of the obtained char in an inert gas atmosphere at a temperature increase rate of 100° C./hour or more to a second predetermined temperature between the first predetermined temperature and 1400° C.; and (5) applying a heat treatment at a temperature of 1000 to 1400° C. with an inert gas at a flow rate of 0.5 to 5.0 L/min relative to 5 g of the char.

Effect of the Invention

The non-aqueous electrolyte secondary battery using the negative electrode comprising the carbonaceous material of the present invention has high charge/discharge capacities, and preferably high charge/discharge efficiency and low resistance.

MODES FOR CARRYING OUT THE INVENTION

Figure 1:
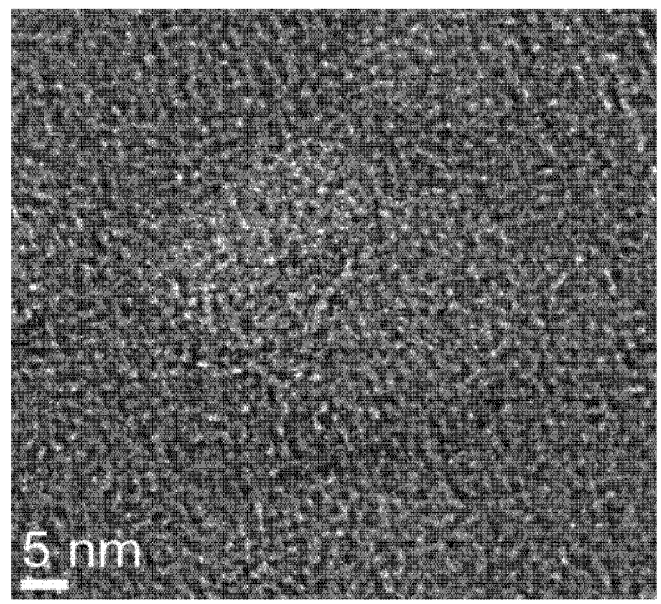
FIG. 1 shows a photograph (TEM image) obtained by transmission electron microscope (TEM) observation of a carbonaceous material fabricated by a method described in Example 1.
Figure 2:
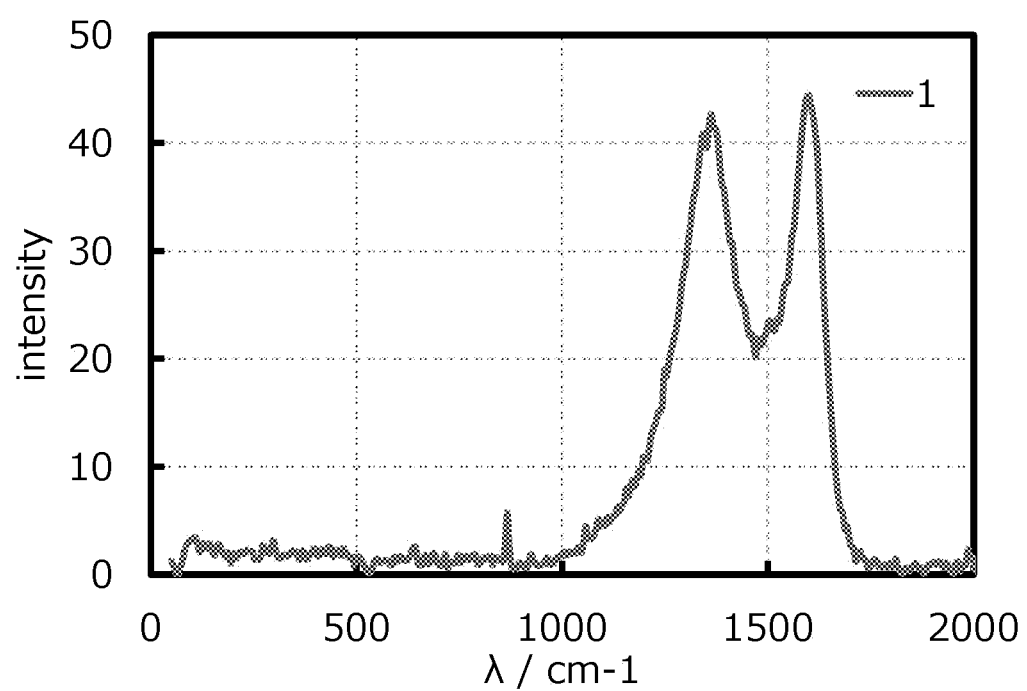
FIG. 2 shows a Raman spectrum observed by laser Raman spectroscopy of a carbonaceous material fabricated by a method described in Example 1.

Embodiments of the present invention will now be described in detail. The scope of the present invention is not limited to the embodiments in this description, and various modifications can be made without departing from the spirit of the present invention.

In a carbonaceous material of the present invention, a nitrogen element content obtained by elemental analysis is 1.0 mass % or more. The nitrogen element content in the carbonaceous material less than 1.0 mass % reduces sites for adsorption/desorption of lithium ions during charge/discharge and tends to decrease charge/discharge capacities. From the viewpoint of achieving a sufficient discharge capacity, the nitrogen element content in the carbonaceous material of the present invention is preferably 1.10 mass % or more, more preferably 1.50 mass % or more, further preferably 1.75 mass % or more. If the nitrogen element content in the carbonaceous material of the present invention is too large, the carbonaceous material is easily distorted in structure so that a layered structure cannot be maintained, and therefore, the sites for adsorption/desorption of lithium ions are reduced. Additionally, nitrogen not taken into the carbon skeleton is expected to exist as a surface functional group such as $—NH_2$ group, and if an amount of such a surface functional group increases, an irreversible side reaction possibly occurring during charge and discharge cannot be suppressed, resulting in a reduction in the discharge capacity and a reduction in the charge/discharge efficiency. From the viewpoint of suppressing the irreversible side reaction during charge and discharge and facilitating increases in the discharge capacity and the charge/discharge efficiency, the nitrogen element content in the carbonaceous material of the present invention is usually 5.0 mass % or less, preferably 3.5 mass % or less (or less than 3.5 mass %), more preferably 3.0 mass % or less, further preferably 2.5 mass % or less, particularly preferably 2.0 mass % or less. Details of measurement of the nitrogen element content are as described later, and the measurement is performed by an elemental analysis method (inert gas dissolution method). A method for adjusting the nitrogen element content to the range is not limited in any way and, for example, the method can comprise mixing a saccharide with a substance capable of generating ammonia gas, increasing temperature at 100° C./hour or more in an inert gas atmosphere, performing a treatment at a temperature of 500 to 1000° C. with an inert gas flow rate of 0.5 to 5.0 L/min relative to 5 g of the saccharide to obtain a char, then increasing temperature at 100° C./hour or more, and performing a heat treatment at a temperature of 1000 to 1400° C. with an inert gas flow rate of 0.5 to 5.0 L/min relative to 5 g of the char. Particularly, if the inert gas flow rate is made larger or the temperature increase rate is too small, the nitrogen element in the carbonaceous material is easily desorbed so that the nitrogen element amount in the obtained carbonaceous material is reduced, and therefore, adjustments may be made in the inert gas flow rate, the temperature increase rate, and the heat treatment temperature.

In the carbonaceous material of the present invention, a hydrogen element content obtained by elemental analysis is preferably 0.10 mass % or less, more preferably 0.08 mass % or less, further preferably 0.06 mass % or less. The hydrogen element content in the carbonaceous material not more than the upper limit is preferable from the viewpoint of reducing a carbon edge portion, expanding a carbon plane, and facilitating movement of electrons. The hydrogen element content in the carbonaceous material of the present invention is preferably 0.01 mass % or more, more preferably 0.02 mass % or more, from the viewpoint of facilitating adsorption/desorption of lithium ions. Details of measurement of the hydrogen element content are as described later, and the measurement is performed by an elemental analysis method (inert gas dissolution method). A method for adjusting the hydrogen element content to the range is not limited in any way and, for example, the method can comprise mixing a saccharide with a substance capable of generating ammonia gas, increasing temperature at 100° C./hour or more in an inert gas atmosphere, performing a treatment at a temperature of 500 to 1000° C. with an inert gas flow rate of 0.5 to 5.0 L/min relative to 5 g of the saccharide to obtain a char, then increasing temperature at 100° C./hour or more, and performing a heat treatment at a temperature of 1000 to 1400° C. with an inert gas flow rate of 0.5 to 5.0 L/min relative to 5 g of the char.

In the carbonaceous material of the present invention, an oxygen element content obtained by elemental analysis is 1.50 mass % or less. If the oxygen element content in the carbonaceous material exceeds 1.50 mass %, an irreversible side reaction possibly occurring during charge and discharge cannot be suppressed, which may cause a reduction in the discharge capacity and a reduction in the charge/discharge efficiency.

From the viewpoint of suppressing the irreversible side reaction during charge and discharge and facilitating increases in the discharge capacity and the charge/discharge efficiency, the oxygen element content in the carbonaceous material of the present invention is preferably 1.30 mass % or less, more preferably 1.20 mass % or less, further preferably, 1.15 mass % or less. The oxygen element content in the carbonaceous material of the present invention is preferably as low as possible, has a lower limit of 0 mass % or more, and is usually 0.10 mass % or more. Details of measurement of the oxygen element content are as described in Examples, and the measurement is performed by an elemental analysis method (inert gas dissolution method) described later. A method for adjusting the oxygen element content to the range is not limited in any way and, for example, the method can comprise mixing a saccharide with a substance capable of generating ammonia gas, increasing temperature at 100° C./hour or more in an inert gas atmosphere, performing a treatment at a temperature of 500 to 1000° C. with an inert gas flow rate of 0.5 to 5.0 L/min relative to 5 g of the saccharide to obtain a char, then increasing temperature at 100° C./hour or more, and performing a heat treatment at a temperature of 1000 to 1400° C. with an inert gas flow rate of 0.5 to 5.0 L/min relative to 5 g of the char.

In the carbonaceous material of the present invention, a ratio $R_{N/H}$ between the nitrogen element content and the hydrogen element content (nitrogen element content/hydrogen element content) is 6 or more and 100 or less, preferably 10 to 80, more preferably 11 to 60, further preferably 12 to 50, from the viewpoint of increasing the nitrogen element content to facilitate an increase in the discharge capacity. A ratio $R_{O/N}$ between the oxygen element content and the nitrogen element content (oxygen element content/nitrogen element content) is 0.10 to 1.0, preferably 0.15 to 0.90, more preferably from 0.20 to 0.80, further preferably from 0.25 to 0.70, from the viewpoint of reducing the oxygen element content to facilitate suppression of the side reaction during charge and discharge. The ratio $R_{N/H}$ between the nitrogen element content and the hydrogen element content is calculated by an equation $R_{N/H}$=nitrogen element content/hydrogen element content from the nitrogen element content and the hydrogen element content measured as described above, and the ratio $R_{O/N}$ between the oxygen element content and the nitrogen element content is calculated from an equation $R_{O/N}$=oxygen element content/hydrogen element content from the oxygen element content and the nitrogen element content measured as described above.

In the carbonaceous material of the present invention, a carbon interplanar spacing ($d_{002}$) calculated by the Bragg equation from a peak position (diffraction angle 2θ) observed by a powder X-ray diffraction method is 3.70 Å or more. For example, when the carbon planes are closest to each other as in graphite, $d_{002}$ is about 3.35 to 3.40 Å, and if $d_{002}$ exceeds 4.00 Å, the carbon planes cannot interact with each other and become unable to maintain a layer structure. From the viewpoint of efficient movement of lithium ions, the carbonaceous material of the present invention preferably has $d_{002}$ widened to a degree not exceeding 4.00 Å. Therefore, a range of $d_{002}$ in the carbonaceous material of the present invention is 3.70 Å or more and 4.00 Å or less, preferably 3.74 Å or more and 3.95 Å or less, more preferably 3.76 Å or more and 3.90 Å or less.

In the carbonaceous material of the present invention, a value of half-value width of a peak near 1360 $cm^{-1}$ of the Raman spectrum observed by laser Raman spectroscopy is preferably 190 $cm^{-1}$ or more and 270 $cm^{-1}$ or less. The peak near 1360 $cm^{-1}$ is a Raman peak generally called a D band, which is a peak attributable to disturbance/defect of the graphite structure. The peak near 1,360 $cm^{-1}$ is usually observed in a range of 1345 $cm^{-1}$ to 1375 $cm^{-1}$, preferably 1350 $cm^{-1}$ to 1370 cm.

These half-value widths are related to the amount of disturbance/defect of the graphite structure contained in the carbonaceous material. Such structural disturbances may be caused by introduction of the nitrogen element into the carbon skeleton. If the half-value width of the Raman peak in the D band is 190 $cm^{-1}$ or less, the disturbance/defect of the graphite structure contained in the carbonaceous material is too small, and the development of the graphite structure decreases micropores between crystals, which tends to decrease sites storing lithium ions. This causes problems such as a reduction in charge/discharge capacity. From the viewpoint of facilitating an increase in the charge/discharge capacity, the half-value width of the peak near 1360 $cm^{-1}$ is preferably 200 $cm^{-1}$ or more, more preferably 215 $cm^{-1}$ or more. If the half-value width is greater than 270 $cm^{-1}$, the disturbance/defect of the graphite structure contained in the carbonaceous material becomes larger, and an amorphous material increases, which tends to decrease sites that may store lithium ions. This may cause a reduction in storage amount of lithium ions and a reduction in the discharge capacity. From such a viewpoint, the half-value width of the peak near 1360 $cm^{-1}$ is preferably 270 $cm^{-1}$ or less, more preferably 260 $cm^{-1}$ or less, further preferably 250 $cm^{-1}$ or less, and still further preferably 245 $cm^{-1}$ or less.

In the carbonaceous material of the present invention, a value of half-value width of a peak near 1650 $cm^{-1}$ of the Raman spectrum observed by laser Raman spectroscopy is preferably 110 $cm^{-1}$ or less. The peak near 1650 $cm^{-1}$ is a Raman peak generally called a G band, which is a peak attributable to disturbance/defect of the graphite structure. The peak near 1,650 $cm^{-1}$ is usually observed in a range of 80 $cm^{-1}$ to 110 $cm^{-1}$, preferably in a range of 90 $cm^{-1}$ to 100 $cm^{-1}$. The half-value width of the Raman peak in the G band is preferably 90 $cm^{-1}$ or more, more preferably 93 $cm^{-1}$ or more, and further preferably 95 $cm^{-1}$ or more. From the viewpoint of allowing the structural development to further progress, facilitating storage of lithium ions between carbon layers, and facilitating an increase in discharge capacity, the half-value width is preferably 100 $cm^{-1}$ or less, more preferably 99.5 $cm^{-1}$ or less, further preferably 99 $cm^{-1}$ or less. On the other hand, from the viewpoint of suppressing the structural development, facilitating release of lithium ions, and further improving the charge and discharge efficiency, the half-value width of the Raman peak in the G band is preferably more than 100 $cm^{-1}$, more preferably 100.5 $cm^{-1}$, further preferably 101 $cm^{-1}$ or more.

According to the preferred carbonaceous material of the present invention having a value of half-value width of the peak near 1360 $cm^{-1}$ of the Raman spectrum observed by laser Raman spectroscopy from 190 or more and 270 or less and the hydrogen element content obtained by elemental analysis of 0.10 mass % or less, the carbonaceous material has micropores sufficient for storing lithium ions, so that high charge/discharge capacities can be obtained, and since the carbon edge portions are reduced and the carbon plane is widened, the lithium ion transport efficiency is increased, so that low resistance and high charge/discharge efficiency are achieved.

The Raman spectrum is measured by using a Raman spectroscope (e.g., Raman spectroscope "LabRAM ARAMIS (VIS)" manufactured by HORIBA, Ltd.).

Specifically, for example, after setting of measurement target particles on an observation stage and focusing an objective lens at magnification of 100 times, the measurement is performed while applying a 532 nm argon ion laser light into a measurement cell with an exposure time of 1 second, an accumulation number of 100, and a measurement range of 50 to 2000 $cm^{-1}$.

A method for adjusting the half-value width of the peak near 1360 $cm^{-1}$ and the half-value width of the peak near 1650 $cm^{-1}$ to the ranges is not limited in any way and, for example, the method can comprise mixing a saccharide with a substance capable of generating ammonia gas, increasing temperature at 100° C./hour or more in an inert gas atmosphere, performing a treatment at a temperature of 500 to 1000° C. with an inert gas flow rate of 0.5 to 5.0 L/min relative to 5 g of the saccharide to obtain a char, then increasing temperature at 100° C./hour or more, and performing a heat treatment at a temperature of 1000 to 1400° C. with an inert gas flow rate of 0.5 to 5.0 L/min relative to 5 g of the char.

A specific surface area obtained by a nitrogen adsorption BET method of the carbonaceous material of the present invention is preferably 1 $m^2/g$ or more, more preferably 1 $m^2/g$ or more from the viewpoint of allowing permeation of the electrolytic solution to bring a battery resistance into a practical range. From the viewpoint of reducing the hygroscopicity of the carbonaceous material to suppress generation of acid and gas accompanying the hydrolysis of an electrolytic solution and water due to moisture present in the carbonaceous material and the viewpoint of reducing a contact area between air and the carbonaceous material to suppress oxidation of the carbonaceous material itself, the specific surface area is preferably 100 $m^2/g$ or less, more preferably 85 $m^2/g$ or less, and further preferably 75 $m^2/g$ or less. Details of measurement of the specific surface area by the nitrogen adsorption BET method are as described later. From the viewpoint of further facilitating permeation of the electrolytic solution and facilitating a reduction in battery resistance, the specific surface area is preferably 40 $m^2/g$ or more, more preferably 45 $m^2/g$ or more, further preferably 50 $m^2/g$ or more.

From the viewpoint of further reducing the hygroscopicity of the carbonaceous material to suppress generation of acid and gas accompanying the hydrolysis of an electrolytic solution and water due to moisture present in the carbonaceous material and the viewpoint of reducing a contact area between air and the carbonaceous material to suppress oxidation of the carbonaceous material itself, the specific surface area obtained by the nitrogen adsorption BET method of the carbonaceous material of the present invention is preferably 35 $m^2/g$ or less, more preferably 30 $m^2/g$ or less, further preferably 20 $m^2/g$ or less, still further preferably 15 $m^2/g$ or less, particularly preferably 12 $m^2/g$ or less.

A method for adjusting the specific surface area to the range is not limited in any way and, for example, the method can comprise mixing a saccharide with a substance capable of generating ammonia gas, increasing temperature at 100° C./hour or more in an inert gas atmosphere, performing a treatment at a temperature of 500 to 1000° C. with an inert gas flow rate of 0.5 to 5.0 L/min relative to 5 g of the saccharide to obtain a char, then increasing temperature at 100° C./hour or more, and performing a heat treatment at a temperature of 1000 to 1400° C. with an inert gas flow rate of 0.5 to 5.0 L/min relative to 5 g of the char.

In the carbonaceous material of the present invention, a mesopore volume calculated by the DFT method is preferably 0.005 to 0.07 mL/g, more preferably 0.01 to 0.06 mL/g or more, further preferably 0.02 to 0.05 mL/g or more. The mesopore volume not less than the lower limit is preferable since pore clogging due to a decomposition product generated during repeated charge and discharge can be suppressed so that an increase in resistance is easily avoided. The mesopore volume not less than the lower limit is preferable since a bulk density reduction can be suppressed and an increase in electrode density is facilitated. In this description, mesopores are pores having a pore size (pore diameter) of 2 nm to 50 nm in the DFT method.

From the viewpoint of facilitating permeation of an electrolytic solution and facilitating a reduction in battery resistance, a mesopore volume calculated by the DFT method not less than 0.03 mL/g is also preferable.

On the other hand, in the carbonaceous material of the present invention, from the viewpoint of enabling further suppression of a bulk density reduction, facilitating an increase in the electrode density, and improving the charge/discharge efficiency, a mesopore volume calculated by the DFT method is preferably less than 0.03 mL/g, more preferably 0.025 mL/g or less.

In the carbonaceous material of the present invention, a micropore volume calculated by the DFT method is 0.0005 to 0.05 mL/g, more preferably 0.001 mL/g to 0.05 mL/g, and further preferably 0.004. to 0.04 mL/g, still further preferably 0.005 to 0.03 mL/g. The lower and upper limit values can be combined with each other. The micropore volume not less than the lower limit is preferable since adsorption and desorption of Li ions are facilitated. The micropore volume not more than the upper limit is preferable since this facilitates the suppression of the reaction between the carbonaceous material and moisture caused during charge/discharge due to moisture adsorption etc. In this description, micropores are pores having a pore size (pore diameter) less than 2 nm in the DFT method.

From the viewpoint of further facilitating the adsorption and desorption of lithium ions and facilitating a reduction in battery resistance, the micropore volume calculated by the DFT method is preferably 0.005 mL/g or more, more preferably 0.01 mL/g or more.

On the other hand, in the carbonaceous material of the present invention, if it is required to further suppress the reaction between the carbonaceous material and moisture caused during charge/discharge due to moisture adsorption etc., or if it is required to further improve the charge/discharge efficiency, the micropore volume calculated by the DFT method is preferably 0.005 mL/g or less, more preferably less than 0.0045 mL/g.

The DFT method is an analysis technique using molecular dynamics and a computer simulation method to calculate an equilibrium density profile of gas adsorbed to a surface and pores of an adsorbed body so that adsorption/desorption isotherm, adsorption heat, etc. can be calculated. Since this analysis method is applicable to the entire region of micropores and mesopores, the micropore volume, the mesopore volume, and the micropore/mesopore distribution can be measured at the same time. In the present invention, the micropore volume and the mesopore volume can be calculated by applying the DFT method to the nitrogen adsorption/desorption isotherm measured by the nitrogen adsorption method.

In the carbonaceous material of the present invention, a pore volume represented by the sum of the micropore and mesopore volumes respectively calculated by the method (calculated by the equation of mesopore volume+micropore volume and hereinafter referred to as "mesopore volume+micropore volume") is preferably 0.005 mL/g or more from the viewpoint of allowing permeation of the electrolytic solution to bring a battery resistance into a practical range. Although the reason why the above effect can be obtained is not clear, a size of pores likely to be clogged due to repeated charge and discharge depends on types of an electrolytic solution and a binder to be used and has no fixed rule. Therefore, it is considered that a low resistance value is maintained when a certain level or more of the micropore volume or the mesopore volume is present. An upper limit of the mesopore volume+micropore volume is 0.15 mL/g or less, for example.

From the viewpoint of facilitating permeation of an electrolytic solution and facilitating a reduction in battery internal resistance, the mesopore volume+micropore volume is preferably 0.05 mL/g or more.

On the other hand, in the carbonaceous material of the present invention, if it is required to reduce an amount of moisture adsorption and suppress an increase in irreversible capacity, the mesopore volume+micropore volume respectively calculated by the method is preferably less than 0.05 mL/g, more preferably 0.04 mL/g or less, and further preferably 0.03 mL/g or less.

A method for adjusting the mesopore volume and the micropore volume as well as the mesopore volume+micropore volume to the range is not limited in any way and, for example, the method can comprise mixing a saccharide with a substance capable of generating ammonia gas, increasing temperature at 100° C./hour or more in an inert gas atmosphere, performing a treatment at a temperature of 500 to 1000° C. with an inert gas flow rate of 0.5 to 5.0 L/min relative to 5 g of the saccharide to obtain a char, then increasing temperature at 100° C./hour or more, and performing a heat treatment at a temperature of 1000 to 1400° C. with an inert gas flow rate of 0.5 to 5.0 L/min relative to 5 g of the char.

An average particle diameter ($D_{50}$) of the carbonaceous material of the present invention is preferably 2 to 30 µm from the viewpoint of coatability during electrode fabrication. The average particle diameter not less than the lower limit is preferable since an increase in specific surface area and an increase in reactivity with the electrolytic solution due to fine powder in the carbonaceous material are suppressed and an increase in irreversible capacity is easily suppressed. Additionally, when a negative electrode is produced by using the obtained carbonaceous material, voids formed in the carbonaceous material can be ensured and the movement of lithium ion in the electrolytic solution is hardly suppressed. From such a viewpoint, the average particle diameter ($D_{50}$) of the carbonaceous material of the present invention is more preferably 3 µm or more, further preferably 4 µm or more, particularly preferably 5 µm or more, most preferably 7 µm or more. On the other hand, the average particle diameter not more than the upper limit is preferable since a small diffusion free path of lithium ions in the particles facilitates provision of rapid charge and discharge. Furthermore, in lithium ion secondary batteries, it is important to increase an electrode area for improvement of input/output characteristics, and therefore, a coating thickness of an active material applied to a collector plate needs to be reduced at the time of electrode preparation. To reduce the coating thickness, it is necessary to reduce the particle diameter of the active material. From such a viewpoint, the average particle diameter is more preferably 20 µm or less, further preferably 18 µm or less, particularly preferably 16 µm or less, most preferably 15 µm or less. $D_{50}$ is the particle diameter at which the cumulative volume is 50% and can be obtained by measuring a particle size distribution with a laser scattering method using a particle diameter/particle size distribution measuring device ("Microtrac MT3300EII" manufactured by MicrotracBEL), for example.

The present invention also provides a production method for a carbonaceous material suitable for a negative electrode active material or a conductive material for non-aqueous electrolyte secondary batteries (e.g., lithium ion secondary batteries, sodium ion batteries, lithium sulfur batteries, lithium air batteries) having high charge/discharge capacities and low resistance. The production method is a method comprising the steps of:

(1) mixing a saccharide with a substance capable of generating ammonia gas;

(2) increasing a temperature of an obtained mixture in an inert gas atmosphere at a temperature increase rate of 100° C./hour or more to a first predetermined temperature between 500 and 1200° C.;

(3) applying a heat treatment at a temperature of 500 to 1200° C. with an inert gas at a flow rate of 0.5 to 5.0 L/min relative to 5 g of the saccharide to obtain a char;

(4) increasing a temperature of the obtained char in an inert gas atmosphere at a temperature increase rate of 100° C./hour or more to a second predetermined temperature between the first predetermined temperature and 1400° C.; and (5) applying a heat treatment at a temperature of 1000 to 1400° C. with an inert gas at a flow rate of 0.5 to 5.0 L/min relative to 5 g of the char, and the carbonaceous material of the present invention can be obtained by this method. In this description, step (2) and/or (3) may be referred to as low temperature calcining (step), and step (4) and/or (5) may be referred to as high temperature calcining (step). The carbonaceous material can be obtained by a usual method, for example, by pulverizing the char with a ball mill or a jet mill. The char may be pulverized after step (3) and/or after step (5).

The saccharide used as a raw material is not particularly limited. Examples thereof comprise monosaccharides such as glucose, galactose, mannose, fructose, ribose, and glucosamine, disaccharides such as sucrose, trehalose, maltose, cellobiose, maltitol, lactobionic acid, and lactosamine, and polysaccharides such as starch, glycogen, agarose, pectin, cellulose, chitin, and chitosan. These saccharides can be used alone or in combination of two or more. Among these saccharides, glucose is preferable due to easy availability in large amount. By using such a saccharide as a raw material, the carbonaceous material derived from the saccharide can be obtained.

The substance capable of generating ammonia gas is not particularly limited and may be any substance capable of generating ammonia gas by heating, and examples of such a substance can comprise inorganic ammonium salts such as ammonium chloride, ammonium sulfate, ammonium carbonate, and ammonium nitrate, organic ammonium salts such as ammonium formate, ammonium acetate, ammonium oxalate, and diammonium hydrogen citrate, and aromatic amine hydrochlorides such as aniline hydrochloride and aminonaphthalene hydrochloride.

A mixing method of the saccharide and the substance capable of generating ammonia gas is not particularly limited, and dry mixing or wet mixing is usable.

In the case of dry mixing, the substance capable of generating ammonia gas can be added to the saccharide to obtain a mixture thereof. In this case, from the viewpoint of uniformly mixing the substance capable of generating ammonia gas and the saccharide, for example, the substance capable of generating ammonia gas and the saccharide are preferably powdered and mixed while being ground down with a mortar or pulverized with a ball mill.

In the case of wet mixing, for example, the saccharide can be dissolved in a solvent to prepare a solution, and the substance capable of generating ammonia gas can then be added to and mixed with the solution. The mixing may be achieved by scattering (spraying etc.) of the solution to the substance capable of generating ammonia gas. Alternatively, the saccharide may be added to and mixed with a solution prepared by dissolving the substance capable of generating ammonia gas in a solvent. After the mixing, the solvent may be evaporated if necessary. By such a treatment, a mixture of the saccharide and the substance capable of generating ammonia gas can be obtained. The solvent to be used is not particularly limited, and examples thereof comprise water, alcohol solvents (ethanol, methanol, ethylene glycol, isopropyl alcohol, etc.), ester solvents (ethyl acetate, butyl acetate, ethyl lactate, etc.), ether solvents (tetrahydrofuran, dimethoxyethane, 1, 4-dioxane, etc.), ketone solvents (acetone, 2-butanone, cyclopentanone, cyclohexanone, etc.), aliphatic hydrocarbon solvents (pentane, hexane, heptane, etc.), aromatic hydrocarbon solvents (toluene, xylene, mesitylene, etc.), nitrile solvents (acetonitrile, etc.), and chlorinated hydrocarbon solvents (dichloromethane, chloroform, chlorobenzene, etc.), and mixtures thereof. Uniform mixing of the saccharide and the substance capable of generating ammonia gas is effectively achieved when both are easily dissolved in the solvent, and therefore, water, an alcohol solvent, and a mixture thereof are preferable as the solvent. A method of evaporating the solvent is not particularly limited and, example thereof comprise a heat treatment and a pressure reduction treatment as well as a method of applying a combination thereof. The temperature of the heat treatment may be a temperature hardly causing the pyrolysis of the substance capable of generating ammonia gas or a temperature hardly causing the pyrolysis of the saccharide and is preferably 40 to 150° C., more preferably 50 to 120° C., further preferably 60 to 100° C., although varying depending on a type of the solvent.

An amount (addition amount) of the substance capable of generating ammonia gas to be mixed with the saccharide is preferably 0.5 molar equivalent or more, more preferably 0.7 molar equivalent or more, further preferably 0.9 molar equivalent or more, particularly preferably 1.0 molar equivalent or more, and preferably 5.0 molar equivalent or less, more preferably 4.0 molar equivalent or less, further preferably 3.5 molar equivalent or less. The amount of the substance capable of generating ammonia gas to be mixed is preferably not less than the lower limit since the nitrogen element is efficiently taken into the obtained carbonaceous material. When the amount of the substance capable of generating the ammonia gas to be mixed is not more than the upper limit, the nitrogen element can be prevented from being excessively taken in, and therefore, the carbon structure is not excessively disturbed, so that an non-aqueous electrolyte secondary battery comprising the obtained carbonaceous material exhibits high charge/discharge capacities and is also facilitated to exhibit a low resistance.

In the production method of the present invention, the mixture obtained from step (1) of mixing a saccharide with a substance capable of generating ammonia gas is increased in temperature and subjected to a first calcining, and the obtained char is subjected to a second calcining.

In the first calcining, suitably, the mixture obtained from step (1) is increased in temperature and is subjected to a heat treatment at a temperature between 500 and 1200° C., preferably 600 and 1150° C., more preferably 700 and 1100° C., further preferably 800 and 1100° C. with an inert gas at a flow rate of 0.5 to 5.0 L/min, preferably a flow rate of 0.6 to 4.0 L/min, more preferably a flow rate of 0.7 to 3.0 L/min, relative to 5 g of the saccharide to obtain a char [step (3)]. An example of the inert gas is nitrogen gas. The temperature of the heat treatment applied with the inert gas may be a constant temperature and is not particularly limited as long as the temperature is within the range.

In this case, the mixture obtained from step (1) of mixing a saccharide with a substance capable of generating ammonia gas is suitably increased in temperature in an inert gas atmosphere such as nitrogen gas at a temperature increase rate of 100° C./hour or more, preferably 100 to 350° C./hour, more preferably 130 to 320° C./hour, further preferably 150 to 300° C./hour to a first predetermined temperature between 500 and 1200° C., preferably 600 and 1150° C., more preferably 700 and 1130° C., further preferably 800 and 1100° C. [step (2)]. The temperature is increased at step (2) in an inert gas atmosphere, and the heat treatment may be applied with an inert gas at a flow rate of 0.5 to 5.0 L/min, preferably a flow rate of 0.6 to 4.0 L/min, more preferably a flow rate of 0.7 to 3.0 L/min, relative to 5 g of the saccharide.

In the production method of the present invention, subsequently, the second calcining is applied to the char obtained from the first calcining. In the second calcining, the char obtained from step (3) is suitably increased in temperature and is subjected to a heat treatment at a temperature between 1000 and 1400° C., preferably 1050 and 1380° C., more preferably 1100 and 1370° C., further preferably 1150 and 1360, particularly preferably 1200 and 1350° C. with an inert gas such as nitrogen gas at a flow rate of 0.5 to 5.0 L/min, preferably a flow rate of 0.6 to 4.0 L/min, more preferably a flow rate of 0.7 to 3.0 L/min, relative to 5 g of the saccharide [step (5)]. The temperature of the heat treatment applied with the inert gas is preferably the second predetermined temperature described below and is not particularly limited as long as the temperature is within the range. The temperature of the heat treatment applied may be a constant temperature and is not particularly limited as long as the temperature is within the range.

In this case, a volatile organic substance may be added to the char obtained from step (3) and used for step (4). The volatile organic substance refers to an organic compound of which a most part (e.g., 80% or more, preferably 90% or more) is volatilized (evaporated or pyrolyzed into gas) without being carbonized when heat-treated with an inert gas such as nitrogen (e.g., at 500° C. or more). Although not particularly limited, examples of the volatile organic substance comprise thermoplastic resins and low-molecular organic compounds. Specifically, examples of the thermoplastic resins include polystyrene, polyethylene, polypropylene, poly(meth)acrylic acid, poly(meth)acrylic acid ester, etc. In this description, (meth)acryl is a generic term for methacryl and acryl. Examples of the low-molecular organic compounds can comprise toluene, xylene, mesitylene, styrene, naphthalene, phenanthrene, anthracene, pyrene, etc. Since it is preferable that the substance volatilizes under the calcining temperature and does not oxidize or activate a surface of a carbon precursor when pyrolyzed, the thermoplastic resin is preferably polystyrene, polyethylene, or polypropylene. From the viewpoint of safety, it is preferable that the low-molecular organic compound has low volatility under ordinary temperature (e.g., 20° C.), and therefore, naphthalene, phenanthrene, anthracene, pyrene etc. are preferable. Addition of such a volatile organic substance is preferable in that the specific surface area can further be reduced while maintaining the characteristic structure of the present invention.

In this case, the char obtained from step (3) is suitably increased in temperature in an inert gas atmosphere such as nitrogen gas at a temperature increase rate of 100° C./hour or more, preferably 100 to 350° C./hour, more preferably 130 to 320° C./hour, further preferably 150 to 300° C./hour to the second predetermined temperature between the first predetermined temperature of 500 to 1200° C. and 1400° C., preferably between the first predetermined temperature of 600 to 1150° C. and 1380° C., more preferably between the first predetermined temperature of 700 to 1130° C. and 1360° C., further preferably between the first predetermined temperature of 800 to 1100° C. and 1350° C. [step (4)]. The temperature is increased at step (4) in an inert gas atmosphere, and the heat treatment may be applied with an inert gas at a flow rate of 0.5 to 5.0 L/min, preferably a flow rate of 0.6 to 4.0 L/min, more preferably a flow rate of 0.7 to 3.0 L/min, relative to 5 g of saccharide.

The second calcining is usually performed at a temperature equal to or higher than the temperature of the first calcining, preferably a temperature higher than the temperature of the first calcining. Therefore, in this description, the first calcining and the second calcining may be referred to as low temperature calcining and high temperature calcining, respectively. The second calcining temperature, i.e., the second predetermined temperature at step (4), is preferably a temperature equal to or higher than the first calcining temperature, i.e., the first predetermined temperature at step (2) since the carbonaceous material to be obtained imparts high charge/discharge capacities and charge/discharge efficiency as well as low resistance when used for an electrode. The second predetermined temperature is more preferably a temperature 50 to 700° C. higher than the first predetermined temperature, further preferably a temperature 100 to 500° C. higher than the first predetermined temperature, and still further preferably a temperature 150 to 400° C. higher than the first predetermined temperature, particularly preferably a temperature 200 to 300° C. higher than the first predetermined temperature.

The carbonaceous material of the present invention or the carbonaceous material obtained from the production method of the present invention can suitably be used as a negative electrode active material for non-aqueous electrolyte secondary batteries. The present invention also provides a non-aqueous electrolyte secondary battery negative electrode comprising the carbonaceous material of the present invention.

A production method of the non-aqueous electrolyte secondary battery negative electrode of the present invention will hereinafter specifically be described. The negative electrode of the present invention can be produced by adding a binder to the carbonaceous material of the present invention, adding an appropriate amount of a suitable solvent, kneading the material into an electrode mixture, then applying and drying the mixture on a collector plate made up of a metal plate etc., and performing pressure forming.

By using the carbonaceous material of the present invention, a highly-conductive electrode (negative electrode) can be produced without adding a conductive assistant. For the purpose of imparting higher conductivity, a conductive assistant can be added at the time of preparation of the electrode mixture as needed. Conductive carbon black, vapor-grown carbon fibers (VGCF), nanotube, etc. can be used as the conductive assistant. Although an addition amount of the conductive assistant varies depending on a type of the conductive assistant to be used, the expected conductivity may not be obtained if the addition amount is too small, and the dispersion in the electrode mixture may be poor if the amount is too large. From such a viewpoint, a preferable proportion of the conductive assistant to be added is 0.5 to 10 mass % (assuming the amount of the active material (carbonaceous material)+the amount of the binder+the amount of the conductive assistant=100 mass %), more preferably 0.5 to 7 mass %, particularly preferably 0.5 to 5 mass %. The binder may be any binder not reactive with an electrolytic solution, such as PVDF (polyvinylidene fluoride), polytetrafluoroethylene, and a mixture of SBR (styrene-butadiene rubber) and CMC (carboxymethyl cellulose), without particular limitation. Among others, PVDF is preferable since PVDF having adhered to the surface of the active material is less likely to inhibit the lithium ion migration so that favorable input/output characteristics are obtained. Although a polar solvent such as N-methylpyrrolidone (NMP) is preferably used for dissolving the PVDF and forming a slurry, an aqueous emulsion such as SBR or CMC dissolved in water is also usable. If the addition amount of the binder is too large, the resistance of the obtained electrode becomes large, so that an increased internal resistance of the battery may deteriorate the battery characteristics. If the addition amount of the binder is too small, bonding between the particles of the negative electrode material and with the collector plate may be insufficient. Although a preferable addition amount of the binder varies depending on a type of the binder to be used, for example, the addition amount of the PVDF-based binder is preferably 3 to 13 mass %, more preferably 3 to 10 mass %. On the other hand, when water is used as a solvent of the binder, a plurality of binders is often mixed and used as in the case of a mixture of SBR and CMC, and the total amount of all the binders to be used is preferably 0.5 to 5 mass %, more preferably 1 to 4 mass %. The carbonaceous material of the present invention in the electrode mixture is preferably 80 mass % or more, more preferably 90 mass % or more. The carbonaceous material of the present invention in the electrode mixture is preferably 100 mass % or less, and more preferably 97 mass % or less.

An electrode active material layer is basically formed on both sides of the collector plate or may be formed on one side as necessary. The thicker electrode active material layer is preferable for higher capacity since the collector plate, a separator, etc. can be reduced. However, a wider electrode area opposed to a counter electrode is more advantageous for improvement of input/output characteristics, and therefore, when the electrode active material layer is too thick, the input/output characteristics may deteriorate. From the viewpoint of output during battery discharge, a thickness of the active material layer (per one side) is preferably 10 to 80 μm, more preferably 20 to 75 μm, further preferably 30 to 75 μm.

A non-aqueous electrolyte secondary battery of the present invention comprises the non-aqueous electrolyte secondary battery negative electrode of the present invention. The non-aqueous electrolyte secondary battery having the non-aqueous electrolyte secondary battery negative electrode comprising the carbonaceous material of the present invention has high charge/discharge capacities and charge/discharge efficiency as well as a low resistance.

When the negative electrode for a non-aqueous electrolyte secondary battery is formed by using the carbonaceous material of the present invention, various materials conventionally used or proposed for non-aqueous electrolyte secondary batteries can be used for other materials constituting the battery, such as a positive electrode material, the separator, and the electrolytic solution, without particular limitation.

For example, for the positive electrode material, layered oxide-based (represented by $LiMO_2$, where M is metal: e.g., $LiCoO_2$, $LiNiO_2$, $LiMnO_2$, or $LiNi_xCo_yMoO_2$ (x, y, and z represent composition ratios)), olivine-based (represented by $LiMPO_4$, where M is metal: e.g., $LiFePO_4$), and spinel-based (represented by $LiM_2O_4$, where M is metal: e.g., $LiMn_2O_4$) composite metal chalcogen compounds are preferable, and these chalcogen compounds may be mixed as needed. The positive electrode is formed by shaping these positive electrode materials together with a suitable binder and a carbonaceous material for imparting conductivity to an electrode such that a layer is formed on the conductive collector plate.

A non-aqueous solvent type electrolyte solution used in combination with these positive and negative electrodes is generally formed by dissolving an electrolyte in a non-aqueous solvent. For the non-aqueous solvent, for example, one or more organic solvents such as propylene carbonate, ethylene carbonate, dimethyl carbonate, diethyl carbonate, dimethoxyethane, diethoxyethane, γ-butyrolactone, tetrahydrofuran, 2-methyltetrahydrofuran, sulfolane, or 1,3-dioxolane can be used alone or in combination. For the electrolyte, $LiClO_4$, $LiPF_6$, $LiBF_4$, $LiCF_3SO_3$, $LiAsF_6$, LiCl, LiBr, $LiB(C_6H_5)_4$, or $LiN(SO_3CF_3)_2$ is used.

The non-aqueous electrolyte secondary battery is generally formed by immersing in the electrolytic solution the positive electrode and the negative electrode formed as described above and opposed to each other across a liquid-permeable separator as needed. For such a separator, a permeable or liquid-permeable separator made of nonwoven fabric normally used for a secondary battery or other porous materials can be used. Alternatively, a solid electrolyte made of polymer gel impregnated with an electrolytic solution may be used instead of, or together with, the separator.

The carbonaceous material of the present invention is suitable for a carbonaceous material for a battery (typically, a non-aqueous electrolyte secondary battery for driving a vehicle) mounted on a vehicle such as an automobile. In the present invention, the vehicle refers to a vehicle generally known as an electric vehicle, a hybrid vehicle with a fuel cell and an internal combustion engine, etc. without particular limitation; however, the vehicle at least comprises a power source device provided with the battery, an electric drive mechanism driven by power supply from the power source device, and a control device controlling this mechanism. The vehicle may further comprise a mechanism provided with a power generation brake and a regenerative brake and converting energy from braking into electricity to charge the non-aqueous electrolyte secondary battery.

The carbonaceous material of the present invention has low resistance and therefore can also be used as an additive imparting conductivity to electrode materials for batteries, for example. Although the types of the batteries are not particularly limited, non-aqueous electrolyte secondary batteries and lead storage batteries are suitable. The carbonaceous material added to an electrode material of such a battery can form a conductive network, and an increase in conductivity enables suppression of an irreversible reaction, so that the battery can have a longer service life.

EXAMPLES

The present invention will hereinafter specifically be described with examples; however, the present invention is not limited to these examples. A method for measuring physical property values of the carbonaceous material will hereinafter be described, and the physical property values described in this description comprising the examples are based on values obtained by the following methods.

(Elemental Analysis)

Elemental analysis was performed by using the oxygen/nitrogen/hydrogen analyzer EMGA-930 manufactured by HORIBA, Ltd.

The detection methods of the analyzer are oxygen: inert gas fusion-non-dispersive infrared absorption method (NDIR), nitrogen: inert gas fusion-thermal conductivity method (TCD), and hydrogen: inert gas fusion-non-dispersive infrared absorption method (NDIR) calibrated with an (oxygen/nitrogen) Ni capsule, $TiH_2$ (H standard sample), and SS-3 (N, O standard sample), and 20 mg of a sample having moisture content measured at 250° C. for about 10 minutes for a pretreatment was put into an Ni capsule and measured after 30 seconds of degasification in the elemental analyzer. The test was performed by analyzing three specimens, and an average value was used as an analysis value.

(X-Ray Diffraction)

X-ray diffraction measurement was performed by filling a carbonaceous material powder in a sample holder and using MiniFlex II manufactured by Rigaku Corporation. CuKα (λ=1.5418 Å) was used as a radiation source, and the scanning range was 10°<2θ<350.

(Raman Spectrum)

Measurement was performed by using the Raman spectroscope ("LabRAM ARAMIS (VIS)" manufactured by HORIBA, Ltd.) with measurement target particles of carbonaceous material set on an observation stage and an objective lens focused at magnification of 100 times while applying an argon ion laser light. Details of measurement conditions are as follows.

Argon ion laser light wavelength: 532 nm
Laser power on sample: 15 mW
Resolution: 5 to 7 $cm^{-1}$
Measurement range: 50 to 2000 cm
Exposure time: 1 second
Accumulation number: 100
Peak intensity measurement:
  Baseline correction, automatic correction with Polynom/third-order
  Peak search and fitting process, GaussLoren
(Specific Surface Area by Nitrogen Adsorption BET Method)

An approximate equation derived from a BET equation is described below.

$$\frac{p/p_0}{v(1-p/p_0)} = \frac{1}{v_m c} + \frac{(c-1)p}{v_m c p_0} \qquad [\text{Mathematical 1}]$$

By using the approximate equation, $v_m$ is obtained by substituting an actually measured adsorption amount (v) at a predetermined relative pressure ($p/p_0$) by a multi-point method according to nitrogen adsorption at the liquid nitrogen temperature, and the specific surface area (SSA: in $m^2g^{-1}$) of the sample was calculated by the following equation.

$$\text{specific surface area} = \left(\frac{v_m Na}{22400}\right) \times 10^{-18} \quad \text{[Mathematical 2]}$$

In the equation, $v_m$ is the adsorption amount ($cm^3/g$) required for forming a monomolecular layer on a sample surface, v is the actually measured adsorption amount ($cm^3/g$), $p_0$ is the saturated vapor pressure, p is the absolute pressure, c is the constant (reflecting the adsorption heat), N is the Avogadro's number $6.022 \times 10^{23}$, and a ($nm^2$) is the area occupied by adsorbate molecules on the sample surface (molecular occupied cross-sectional area).

Specifically, the amount of nitrogen adsorption to the carbonaceous material at the liquid nitrogen temperature was measured by using "Autosorb-iQ-MP" manufactured by Quantachrome as follows. After the carbonaceous material used as a measurement sample was filled in a sample tube and the sample tube was cooled to −196° C., the pressure was once reduced, and nitrogen (purity: 99.999%) was then adsorbed to the measurement sample at a desired relative pressure. An adsorbed gas amount v was defined as an amount of nitrogen adsorbed to the sample when the equilibrium pressure was reached at each desired relative pressure.

The adsorption isotherm obtained from the measurement of the nitrogen adsorption amount was analyzed by the DFT method, and a volume of pores having a pore size (pore diameter) less than 2 nm and a volume of pores having a pore size (pore diameter) of 2 nm or more and 50 nm or less are calculated as the micropore volume and the mesopore volume, respectively.

(Average Particle Diameter by Laser Scattering Method)

The average particle diameter (particle size distribution) of plant-derived char and the carbonaceous material was measured by the following method. The sample was put into an aqueous solution containing 5 mass % surfactant ("Toriton X100" manufactured by Wako Pure Chemical Industries), treated by an ultrasonic cleaner for 10 minutes or more, and dispersed in the aqueous solution. The particle size distribution was measured by using this dispersion. Particle size distribution measurement was performed by using a particle diameter/particle size distribution measuring device ("Microtrac MT3000 EXII" manufactured by MicrotracBEL). $D_{50}$ is the particle diameter at which the cumulative volume is 50%, and this value was used as the average particle diameter.

(Tem Observation)

TEM observation was performed by using a field-emission transmission electron microscope ("JEM-2100F" manufactured by JEOL Ltd.). From an obtained TEM image, a laminated structure and a planar structure of the carbon skeleton were not recognized, and a turbostratic structure was recognized.

Example 1

Glucose and ammonium chloride were mixed in a mortar. An obtained mixture was increase in temperature to 1000° C. in a nitrogen gas atmosphere. In this process, the temperature increase rate to 1000° C. was 240° C./hour (4° C./min). The mixture was then heat-treated at 1000° C. for 60 minutes under a nitrogen gas stream to perform a carbonization treatment and thereby obtain a char (the first calcining). In this process, a supply amount of nitrogen gas was 1 L/min per 5 g of glucose. Subsequently, the obtained char was pulverized by a ball mill to obtain a pulverized carbonaceous material. The pulverized char was then increased in temperature to 1300° C. and heat-treated at 1300° C. for 60 minutes to perform a high-temperature calcining treatment and thereby obtain a carbonaceous material (the second calcining). In this process, the temperature increase rate to 1300° C. was 600° C./hour (10° C./min). The temperature increase and the heat treatment were performed under a nitrogen gas stream. A supply amount of nitrogen gas was 3 L/min per 5 g of the pulverized char.

Example 2

A carbonaceous material was obtained by performing the treatments as in Example 1 except that ammonium sulfate was used instead of ammonium chloride.

Example 3

A carbonaceous material was obtained by performing the treatments as in Example 1 except that the calcining temperature during the second calcining was 1200° C.

Example 4

A carbonaceous material was obtained by performing the treatments as in Example 2 except that the calcining temperature during the second calcining was 1200° C.

Example 5

A carbonaceous material was obtained by performing the treatments as in Example 3 except that starch was used instead of glucose and diammonium hydrogen citrate was used instead of ammonium chloride and that the temperature increase rate during the first calcining was 10° C./min.

Example 6

A carbonaceous material was obtained by performing the treatments as in Example 5 except that the calcining temperature during the first calcining was 600° C.

Example 7

A carbonaceous material was obtained by performing the treatments as in Example 6 except that the addition amount of diammonium hydrogen citrate was 0.55 mol per 1 mol of monosaccharide unit of starch.

Example 8

A carbonaceous material was obtained by performing the treatments as in Example 5 except that ammonium chloride was used instead of diammonium hydrogen citrate and 10 parts by mass of polystyrene (PSt) was added at the time of the second calcining to 100 parts by mass of the char obtained by the first calcining.

Comparative Example 1

A carbonaceous material was obtained as in Example 1 except that ammonium chloride was not mixed.

Comparative Example 2

A carbonaceous material was obtained by performing the treatments as in Example 1 except that the calcining temperature was 1500° C.

Comparative Example 3

A carbonaceous material was obtained by performing the treatments as in Example 1 except that the nitrogen gas supply amount during the carbonization treatment was 10 L/min per 5 g of glucose.

Comparative Example 4

A carbonaceous material was obtained by performing the treatments as in Example 1 except that the temperature increase rate to 1000° C. during the carbonization treatment was 60° C./hour (1° C./min).

Comparative Example 5

In a three-necked flask equipped with a stirrer and a cooling tube, 100 parts of aniline, 697 parts of 37% formaldehyde aqueous solution, and 2 parts of oxalic acid were placed, reacted at 100° C. for 3 hours, and dehydrated to obtain 110 parts of aniline resin. The obtained aniline resin had a weight average molecular weight of about 700. A resin composition obtained by pulverizing and mixing 100 parts of the aniline resin obtained as described above and 10 parts of hexamethylenetetramine is treated in the order of the following steps (1) to (4) to obtain a carbonaceous material.

(1) Without performing reducing gas replacement, inert gas replacement, reducing gas circulation, or inert gas circulation, the composition was increased in temperature to 500° C. at a temperature increase time of 100° C./hour (1.7° C./min), subjected to a degreasing treatment at 500° C. for 2 hours, and then cooled to obtain a char.

(2) The char was pulverized with a ball mill to obtain a pulverized char.

(3) The temperature was increased to 1200° C. with a nitrogen gas supply amount of 3 L/min per 5 g of the pulverized char at a temperature increase rate of 100° C./hour (1.7° C./min) and then kept for 8 hours.

(4) The pulverized char was cooled to room temperature with a nitrogen gas supply amount of 3 L/min per 5 g of the pulverized char to obtain a carbonaceous material.

Comparative Example 6

A carbonaceous material was obtained by performing the treatments as in Example 6 except that the addition amount of diammonium hydrogen citrate was 0.11 mol per 1 mol of monosaccharide unit of starch (Production of Electrode)

By using the carbonaceous materials obtained in Examples and Comparative Examples, respective negative electrodes were fabricated according to the following procedure.

A slurry was obtained by mixing 92 parts by mass of the carbonaceous material, 4 parts by mass of PVDF (polyvinylidene fluoride), and 90 parts by mass of NMP (N-methylpyrrolidone). The obtained slurry was applied to a copper foil having a thickness of 14 m, dried, and then pressed to obtain an electrode having a thickness of 75 μm. The obtained electrode had a density of 0.8 to 1.0 g/cm$^3$.

(Impedance)

To the fabricated electrode, an amplitude of 10 mV was applied with 0 V defined as the center at 25° C. by using an electrochemical measurement device ("1255WB high-performance electrochemical measurement system" manufactured by Solartron) to measure a constant voltage AC impedance at a frequency of 10 mHz to 1 MHz, and real part resistance at frequencies of 1 kHz was measured as impedance resistance.

(DC Resistance Value, Battery Initial Capacity, and Charge/Discharge Efficiency)

The electrode fabricated as described above was used as a working electrode, and metallic lithium was used as a counter electrode and a reference electrode. Propylene carbonate and ethylene glycol dimethyl ether were mixed and used as a solvent at a volume ratio of 1:1. In this solvent, 1 mol/L of LiClO$_4$ was dissolved and used as an electrolyte. A polypropylene film was used for the separator. A coin cell was fabricated in a glove box under an argon atmosphere.

For the lithium secondary battery having the structure described above, a charge/discharge test was performed after measuring DC resistance value before initial charge by using a charge/discharge test device ("TOSCAT" manufactured by Toyo System). Doping of lithium was performed at a rate of 70 mA/g with respect to the active material mass, and doping was performed to 1 mV relative to the lithium potential. A constant voltage of 1 mV relative to the lithium potential was further applied for 8 hours before terminating the doping. A capacity (mAh/g) at this point was defined as the charge capacity. Subsequently, dedoping was performed at a rate of 70 mA/g with respect to the active material mass to 2.5 V relative to the lithium potential, and a capacity discharged at this point was defined as the discharge capacity. The percentage of the discharge capacity/charge capacity was defined as the charge/discharge efficiency (initial charge/discharge efficiency) and was used as an index of the utilization efficiency of lithium ions in the battery.

The carbonaceous material production conditions in Examples and Comparative Examples, the evaluation results of the physical properties of the obtained carbonaceous materials, and the evaluation results of the battery characteristics are respectively described in the following tables.

The battery fabricated by using the carbonaceous materials of Examples had a low resistance value and a high discharge capacity while maintaining a constant charge/discharge efficiency. On the other hand, in the case of the batteries fabricated by using the carbonaceous materials of Comparative Examples without $R_{N/H}$ or $R_{O/N}$ in a predetermined range or without a predetermined nitrogen content, a sufficiently low resistance value was not achieved, and the discharge capacity was not sufficient.

TABLE 1 carbonaceous material manufacturing conditions

| type | No. | raw material carbon source | raw material ammonium salt | mixing ratio mol ratio | temperature increase rate during first calcining °C./min | N$_2$ flow rate during first calcining L/min | first calcining temperature °C. | second calcining temperature °C. |
|---|---|---|---|---|---|---|---|---|
| Example | 1 | glucose | NH$_4$Cl | 1:1.1 | 4 | 1 | 1000 | 1300 |
|  | 2 | glucose | (NH$_4$)$_2$SO$_4$ | 1:1.1 | 4 | 1 | 1000 | 1300 |
|  | 3 | glucose | NH$_4$Cl | 1:1.1 | 4 | 1 | 1000 | 1200 |
|  | 4 | glucose | (NH$_4$)$_2$SO$_4$ | 1:1.1 | 4 | 1 | 1000 | 1200 |
|  | 5 | starch | diammonium hydrogen citrate | 1:1.1 | 10 | 1 | 1000 | 1200 |
|  | 6 | starch | diammonium hydrogen citrate | 1:1.1 | 10 | 1 | 600 | 1200 |
|  | 7 | starch | diammonium hydrogen citrate | 1:0.55 | 10 | 1 | 600 | 1200 |
|  | 8 | starch | NH$_4$Cl | 1:1.1 | 10 | 1 | 1000 | 1200 |
| Comparative example | 1 | glucose | none | none | 4 | 1 | 1000 | 1300 |
|  | 2 | glucose | NH$_4$Cl | 1:1.1 | 4 | 1 | 1000 | 1500 |
|  | 3 | glucose | NH$_4$Cl | 1:1.1 | 4 | 10 | 1000 | 1300 |
|  | 4 | glucose | NH$_4$Cl | 1:1.1 | 1 | 1 | 1000 | 1300 |
|  | 5 | aniline resin:formaldehyde:oxalic acid |  | 100:697:2 | 1.7 | 3 | 1000 | 1200 |
|  | 6 | starch | diammonium hydrogen citrate | 1:0.11 | 4 | 1 | 1000 | 1200 |

TABLE 2 carbonaceous material physical properties

| type | No. | X-ray diffraction d$_{002}$ Å | Raman spectrum D-band cm$^{-1}$ | Raman spectrum G-band cm$^{-1}$ | R value I$_D$/I$_G$ |
|---|---|---|---|---|---|
| Example | 1 | 3.82 | 209 | 97 | 1.09 |
|  | 2 | 3.81 | 204 | 97 | 1.12 |
|  | 3 | 3.81 | 239 | 99 | 1.12 |
|  | 4 | 3.80 | 234 | 98 | 1.13 |
|  | 5 | 3.79 | 249 | 102 | 1.11 |
|  | 6 | 3.77 | 249 | 101 | 1.15 |
|  | 7 | 3.82 | 240 | 101 | 1.09 |
|  | 8 | 3.79 | 244 | 101 | 1.13 |
| Comparative Example | 1 | 3.81 | 166 | 95 | 1.18 |
|  | 2 | 3.72 | 175 | 93 | 1.19 |
|  | 3 | 3.79 | 171 | 92 | 1.18 |
|  | 4 | 3.81 | 170 | 93 | 1.16 |
|  | 5 | 3.64 | 162 | 96 | 1.11 |
|  | 6 | 3.69 | 188 | 96 | 1.17 |

TABLE 3 carbonaceous material physical properties N$_2$ adsorption measurement

| type | No. | SSA m$^2$ g$^{-1}$ | micropore mLg$^{-1}$ | mesopore mLg$^{-1}$ |
|---|---|---|---|---|
| Example | 1 | 58.0 | 0.0053 | 0.0517 |
|  | 2 | 68.9 | 0.0231 | 0.0286 |
|  | 3 | 40.2 | 0.0105 | 0.0412 |
|  | 4 | 51.5 | 0.0202 | 0.0312 |
|  | 5 | 6.6 | 0.0011 | 0.0125 |
|  | 6 | 3.5 | 0.0012 | 0.0134 |
|  | 7 | 7.2 | 0.0022 | 0.0119 |
|  | 8 | 4.1 | 0.0045 | 0.0238 |
| Comparative Example | 1 | 54.1 | 0.0000 | 0.0443 |
|  | 2 | 32.1 | 0.0041 | 0.0321 |
|  | 3 | 28.4 | 0.0031 | 0.0293 |
|  | 4 | 16.3 | 0.0021 | 0.0062 |
|  | 5 | 6.2 | 0.0011 | 0.0031 |
|  | 6 | 25.4 | 0.0024 | 0.0088 |

TABLE 4 carbonaceous material physical properties elemental analysis

| type | No. | O mass % | N mass % | H mass % | N/H ratio | O/N ratio |
|---|---|---|---|---|---|---|
| Example | 1 | 0.55 | 1.11 | 0.06 | 19.04 | 0.50 |
|  | 2 | 0.58 | 1.18 | 0.02 | 49.11 | 0.49 |
|  | 3 | 1.03 | 1.79 | 0.10 | 17.56 | 0.58 |
|  | 4 | 1.07 | 1.90 | 0.05 | 38.00 | 0.56 |
|  | 5 | 0.45 | 1.69 | 0.08 | 21.13 | 0.27 |
|  | 6 | 0.42 | 1.67 | 0.11 | 15.18 | 0.25 |
|  | 7 | 0.46 | 1.55 | 0.10 | 15.50 | 0.30 |
|  | 8 | 0.40 | 1.75 | 0.10 | 18.01 | 0.23 |
| Comparative Example | 1 | 0.42 | 0.12 | 0.06 | 1.98 | 3.43 |
|  | 2 | 0.33 | 0.33 | 0.04 | 8.25 | 1.00 |
|  | 3 | 0.31 | 0.78 | 0.02 | 39.00 | 0.40 |
|  | 4 | 0.52 | 0.18 | 0.07 | 2.74 | 2.85 |
|  | 5 | 1.48 | 1.60 | 0.42 | 3.8 | 0.93 |
|  | 6 | 0.87 | 0.72 | 0.11 | 6.55 | 1.21 |

TABLE 5

| type | No. | discharge capacity mAhg⁻¹ | irreversible capacity mAhg⁻¹ | efficiency % |
|---|---|---|---|---|
| | | carbonaceous material battery characteristics charge/discharge characteristics | | |
| Example | 1 | 415 | 79 | 84.0 |
| | 2 | 423 | 85 | 83.3 |
| | 3 | 509 | 124 | 80.4 |
| | 4 | 512 | 128 | 80.0 |
| | 5 | 483 | 88.0 | 84.6 |
| | 6 | 492 | 83.8 | 85.4 |
| | 7 | 497 | 88.8 | 84.8 |
| | 8 | 493 | 89.2 | 84.7 |
| Comparative Example | 1 | 351 | 73 | 82.8 |
| | 2 | 321 | 51 | 86.5 |
| | 3 | 362 | 73 | 83.2 |
| | 4 | 352 | 72 | 83.0 |
| | 5 | 390 | 70 | 85.0 |
| | 6 | 345 | 74 | 83.5 |

TABLE 6

| type | No. | DC resistance during initial charge/discharge Ω | impedance during initial charge/discharge Ω |
|---|---|---|---|
| | | carbonaceous material battery characteristics charge/discharge characteristics | |
| Example | 1 | 582 | 9.5 |
| | 2 | 560 | 9.6 |
| | 3 | 572 | 9.5 |
| | 4 | 554 | 9.5 |
| | 5 | 595 | 9.8 |
| | 6 | 598 | 9.9 |
| | 7 | 614 | 10 |
| | 8 | 632 | 9.9 |
| Comparative Example | 1 | 657 | 9.8 |
| | 2 | 695 | 10.1 |
| | 3 | 595 | 9.7 |
| | 4 | 632 | 9.7 |
| | 5 | 701 | 10.2 |
| | 6 | 662 | 10 |

The invention claimed is:

1. A carbonaceous material having a nitrogen content of 1.0 mass % or more and an oxygen content of 1.5 mass % or less as measured by elemental analysis, a ratio of the nitrogen content and a hydrogen content ($R_{N/H}$) of 6 or more and 100 or less, a ratio of the oxygen content and the nitrogen content ($R_{O/N}$) of 0.1 or more and 1.0 or less, and a carbon interplanar spacing ($d_{002}$) observed by X-ray diffraction measurement of 3.70 Å or more.

2. The carbonaceous material according to claim 1, wherein a value of half-value width of a peak near 1360 cm⁻¹ of a Raman spectrum observed by laser Raman spectroscopy is 190 to 270 cm⁻¹.

3. The carbonaceous material according to claim 1, wherein a value of half-value width of a peak near 1360 cm⁻¹ of a Raman spectrum observed by laser Raman spectroscopy is 190 to 250 cm⁻¹.

4. The carbonaceous material according to claim 1, wherein a value of half-value width of a peak near 1650 cm⁻¹ of a Raman spectrum observed by laser Raman spectroscopy is 100 cm⁻¹ or less.

5. The carbonaceous material according to claim 1, wherein a half-value width of a peak near 1650 cm⁻¹ of a Raman spectrum observed by laser Raman spectroscopy exceeds 100 cm⁻¹.

6. The carbonaceous material according to claim 1, wherein a specific surface area measured by a BET method is 40 m²/g or more, and wherein a pore volume represented by a sum of a micropore volume and a mesopore volume is 0.05 mL/g or more.

7. The carbonaceous material according to claim 1, wherein a specific surface area measured by a BET method is 35 m²/g or less, and wherein a pore volume represented by a sum of a micropore volume and a mesopore volume is less than 0.05 mL/g.

8. The carbonaceous material according to claim 1, wherein the carbonaceous material is derived from a saccharide.

9. A negative electrode active material for a non-aqueous electrolyte secondary battery, wherein the negative electrode active material comprises the carbonaceous material according to claim 1.

10. A non-aqueous electrolyte secondary battery negative electrode comprising the carbonaceous material according to claim 9.

11. A non-aqueous electrolyte secondary battery comprising the non-aqueous electrolyte secondary battery negative electrode according to claim 10.

12. A method of producing the carbonaceous material according to claim 1, the method comprising:
   (1) mixing a saccharide with a substance capable of generating ammonia gas to obtain a mixture;
   (2) increasing a temperature of the mixture in an inert gas atmosphere at a temperature increase rate of 100° C./hour or more to a first predetermined temperature between 500 and 1200° C.;
   (3) applying a heat treatment at a temperature of 500 to 1200° C. with an inert gas at a flow rate of 0.5 to 5.0 L/min relative to 5 g of the saccharide to obtain a char;
   (4) increasing a temperature of the obtained char in an inert gas atmosphere at a temperature increase rate of 100° C./hour or more to a second predetermined temperature between the first predetermined temperature and 1400° C.; and
   (5) applying a heat treatment at a temperature of 1000 to 1400° C. with an inert gas at a flow rate of 0.5 to 5.0 L/min relative to 5 g of the char.

13. The method according to claim 12, wherein the first predetermined temperature is between 800 and 1100° C.